United States Patent [19]

Steprath et al.

[11] Patent Number: 4,513,826

[45] Date of Patent: Apr. 30, 1985

[54] HYDRAULIC CONTROL ARRANGEMENT FOR ACTUATING LIFTING MECHANISM OF AN AGRICULTURAL MACHINE

[75] Inventors: Werner Steprath, Dormagen; Dieter Weigle, Urach, both of Fed. Rep. of Germany

[73] Assignee: Robert Bosch GmbH, Stuttgart, Fed. Rep. of Germany

[21] Appl. No.: 424,969

[22] Filed: Sep. 27, 1982

[30] Foreign Application Priority Data

Mar. 15, 1982 [DE] Fed. Rep. of Germany ....... 3209396

[51] Int. Cl.³ ............................................ A01B 63/112
[52] U.S. Cl. ........................................................ 172/7
[58] Field of Search ..................... 172/7, 9, 10; 91/461

[56] References Cited

U.S. PATENT DOCUMENTS 4,145,956 3/1979 Rumrill, Jr. et al. ............. 91/461 X
4,293,040 10/1981 O'Connor ................................ 172/7

FOREIGN PATENT DOCUMENTS 3021777 12/1981 Fed. Rep. of Germany .

Primary Examiner—Richard T. Stouffer
Attorney, Agent, or Firm—Michael J. Striker

[57] ABSTRACT

A hydraulic control arrangement for actuating a lifting mechanism of an agricultural machine has a hydraulic motor arranged to lift and lower at least one member of a lifting mechanism, a hydraulic pressure medium source, a directional control valve arranged to control the hydraulic motor, a structural element having a bending elasticity arranged so that forces transmitted from the lifting mechanism member in a machine housing are at least partially transmitted via the structural element and the latter is bent, and a hydromechanical transformer having two parts movable relative to one another and a hydraulic control circuit for controlling the directional control valve and arranged so that bending of the structural element is used by the transformer as an adjusting member, wherein the structural element is directly formed as these parts movable relative to one another and influencing in a pressure medium streams through the transformer, and the parts include a first part which is hollow, has bending elasticity and is exposed to the bending forces, and a second part which does not have bending elasticity, is not exposed to the bending forces and is received in the first part, and the second part is fixedly connected in at least one point with the first part and has a free end which is spaced from this point and forms an adjustable throttling point of the transformer.

21 Claims, 5 Drawing Figures

HYDRAULIC CONTROL ARRANGEMENT FOR ACTUATING LIFTING MECHANISM OF AN AGRICULTURAL MACHINE

BACKGROUND OF THE INVENTION

The present invention relates to a hydraulic control arrangement for actuating a lifting mechanism of an agricultural machine. More particularly it relates to a hydraulic arrangement for actuating a lifting mechanism of an agricultural machine, particularly a tractor, which has a pressure medium source, a directional control valve for controlling a hydraulic motor which lifts and lowers at least one member coupled with a machine, wherein forces transmitted from the member in a machine housing are at least partially transmitted via a structural element with bending elasticity whose bending is used by a hydromechanic transformer as a control value, and a hydraulic control valve of the transformer controls the directional control valve.

A hydraulic control arrangement of the abovementioned general type is known in the art. Such a control arrangement is disclosed, for example, in a German Offenlegungsschrift No. 3,021,777. The control arrangement disclosed in this reference is used for controlling the pulling force in lower members of a tractor lifting mechanism, wherein a supporting frame with a bending bar is fixedly mounted on the housing of the tractor. The bending of the bending bar is determined as a control value by a pick-up and supplied to a control circuit. Thereby test data indicating jumps are avoided in an advantageous manner because of a play which can take place during load variations of measured pulling and pressing forces in the lower members. This control arrangement possesses however, the disadvantages that it has high structural expenses for a rigid supporting frame with the bending bar. In addition to this, a space required for such a supporting frame with the bending bar is frequently not available in the tractors. Further the deviation of the control value by the deformation of the bending bar only from a portion of the forces in the lower member can disadvantageously affect the accuracy of the control. Moreover, the arrangement of the pick-up at all ends of the bending bar subjected to carrying leads in practice to difficulties, particularly for the signal pick up. For many applications, there is further the disadvantage that in this control arrangement the bending bar can engage only the sum of the lower member forces.

Another hydraulic control arrangement is disclosed in the U.S. Pat. No. 4,085,806 and used for pulling force control in a tractor. The forces acting upon a member is measured via a torsion spring and transformed in a path which then is available via a control linkage for controlling a directional control valve. The disadvantage of this control arrangement is the high expenses, particularly in the sense of the space and material. Moreover, this construction is less suitable for a fully hydraulically operating control arrangement for lifting mechanism adjustment. In addition, this control arrangement works with a relatively great hysteresis.

SUMMARY OF THE INVENTION

Accordingly, it is an object of the present invention to provide a control arrangement for actuating a lifting mechanism of an agricultural machine, which avoids the disadvantages of the prior art.

More particularly, it is an object of the present invention to provide a control arrangement for actuating a lifting mechanism of an agricultural machine which is very simple and sturdy. In keeping with these objects and with others which will become apparent hereinafter, one feature of the present invention resides, briefly stated, in a hydraulic control arrangement for actuating a lifting mechanism of an agricultural machine, in which a structural element with bending elasticity is directly formed as parts of a hydromechanical transformer movable relative to one another and influencing a pressure medium stream through the transformer, wherein these parts include a first part which is hollow, has bending elasticity and is exposed to bending forces, and a second part which has less bending elasticity than the first part, is not exposed to the bending forces and is received in the first part, wherein the second part is fixedly connected in at least one point with the first part and has a free end which is spaced from this point and forms an adjustable throttling point of the transformer.

When the control arrangement is designed in accordance with the present invention, it eliminates the disadvantages of the prior art. The coupling point for a lifting mechanism member of a conventional three-point coupling linkage, with the measuring springs, and the hydromechanical transformer for driving the control value are assembled in a compact structural unit. This results in a space economical and inexpensive construction. Because of compact construction, the transformer can have a sufficiently high output, amplification and accuracy.

In accordance with another especially advantageous feature of the present invention, the structural elements with bending elasticity is formed as a cantilever beam clamped at its one side. In the arrangement designed in accordance with this feature, there is a simple construction which provides for a relatively great stroke in the region of the throttling point.

Yet another feature of the present invention is that the arrangement is provided with a pin supporting the lifting mechanism member between legs of a housing fixed fork-shaped support and forming the hydromechanical transformer, wherein the pin has an inlet and an outlet for the hydraulic pressure medium. The thus-formed control arrangement is simple and inexpensive and uses available pins for supporting the lower members as a part of the transformer.

A further feature of the present invention is that the pin has a sleeve which forms the first part of the structural element with bending elasticity, wherein the sleeve has one end fixedly held in one of the legs of the support, and another end extending through the other leg of the support with a radial play and forming in this region the adjustable throttling point of the transformer. The thus-formed transformer provides a high sensitivity.

Still a further feature of the present invention is that the other leg of the support surrounds the pin with radial play and forms an abutment for the pin bending under the load. This construction provides for a limit to the stroke and thereby active overloading protection.

It is especially advantageous when the pressure medium ports are formed at one side of the transformer.

Still a further feature of the present invention is that the pin has a sleeve forming the first part of the structural element with bending elasticity and is clamped in both legs of the support, whereas the second part of the structural element is supported in the region of one of the legs and the lifting mechanism member and forms with its free end in the region of the other leg the adjustable throttling point. This construction is favorable first of all when the lower member is exposed to high forces.

In contrast, in the event of small forces the structural element with bending elasticity can be composed of a different material than steel, for example of a fiber reinforced synthetic material or tombac which has a sufficiently high strength, but because of its low coefficient of elasticity provides for a great deformation.

For tractors in which for coupling the lower member a throughgoing axle is provided in the housing, it is advantageous to use a control arrangement in which the structural element with bending elasticity has a bending pipe which forms the first part and is provided at its one end with coupling pins supporting the lifting mechanism member, whereas the bending pipe is fixed centrally between the lifting mechanism member in a machine housing and is simultaneously clamped with the second part, and the second part extends with its free ends into the coupling pins respectively and forms there two hydraulic throttling points.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
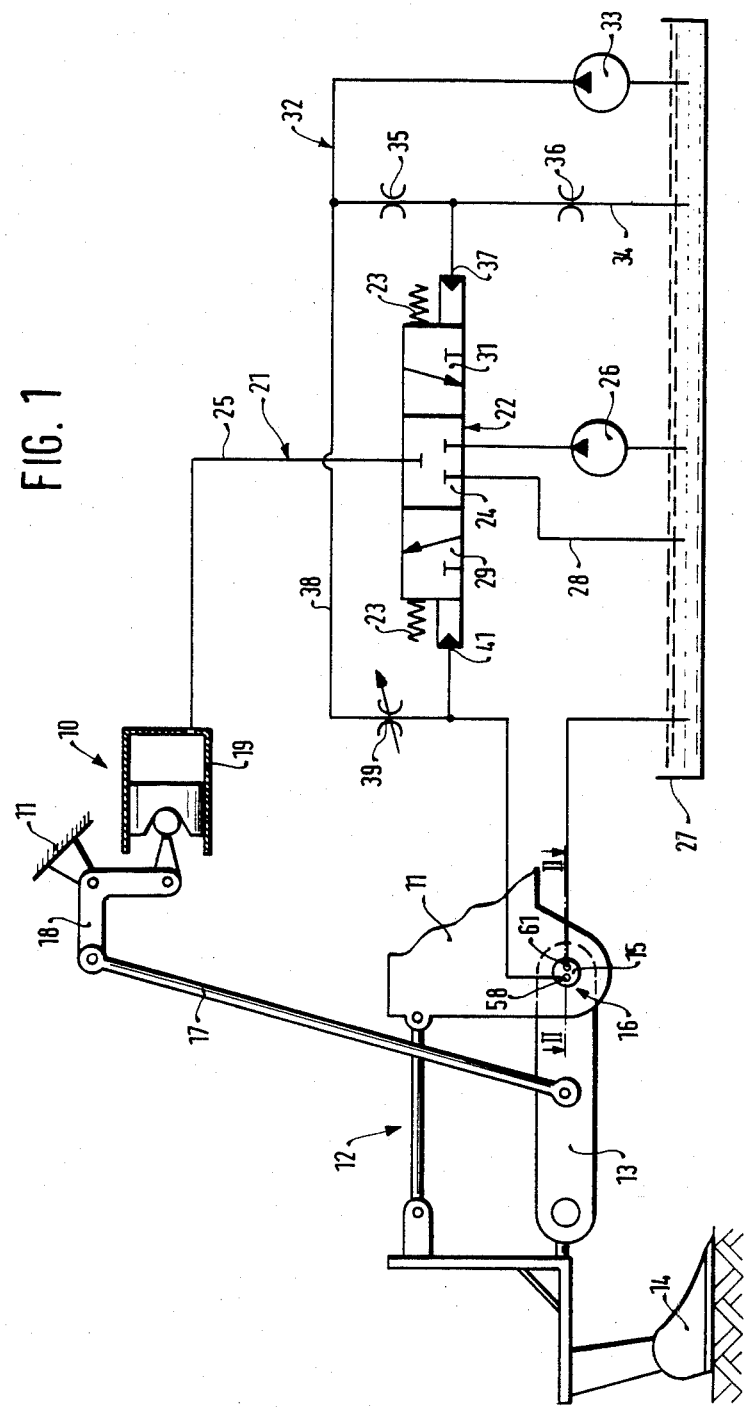
FIG. 1 is a view showing a hydraulic control arrangement for a pulling force adjustment in a lower member of a tractor, in accordance with the present invention.

FIG. 1 shows a part of a tractor 10 with a housing 11. A plow 14 is mounted on the housing 11 with the aid of a conventional three point linkage 12 with a supporting or lower member 13. The member 13 is pivotally supported with the aid of a pin 15 in the housing 11. The pin 15 simultaneously integrates a hydromechanical transformer 16.

The member 13 is connected via a lifting rod 17 and a housing-fixed lifting arm 18 with a power lift 19 which provides for lifting and lowering of the plow 14. For lifting and lowering the member 13, the power lift 19 is arranged in a hydraulic working circuit 21 to which a control valve 22 belongs. A control slider of the control valve 22 is centered by a spring 23 in the shown central position 24. In this position it is separated from a working conduit 25 leading to the power lift 19, from a pump 26 and also from a return conduit 28 leading to a container 27.

The hydraulically displaceable control slider of the control valve 22 can assume a lifting position 29 in which it controls the pressure medium supplied by the pump 26 to the power lift 19. Further, the control slider during its displacement in the opposite direction, can assume a lowering position in which it unloads the power lift 19 to the return conduit 28. For hydraulic actuation of the control valve 22, a hydraulic control circuit 32 is provided on the tractor 10 which is formed as a complete hydraulic bridge and supplied with pressure medium from a control oil pump 33. Two fixed throttling points 35 and 36 lie in a first bridge branch 34 of this bridge, whereby the intermediate pressure between the throttling points is supplied to a control connection 37 of the control valve 22. Two adjustable throttling points 39 and 16 arranged in a row relative to one another are provided in the other second bridge branch 38, and the pressure between these adjustable throttling points is supplied to a control connection 41 of the control valve. The adjustable throttling point 39 serves as a nominal value transmitter of the control circuit, whereas the hydromechanical transformer 16 has an actual value transmitter of the control circuit.

Figure 2:
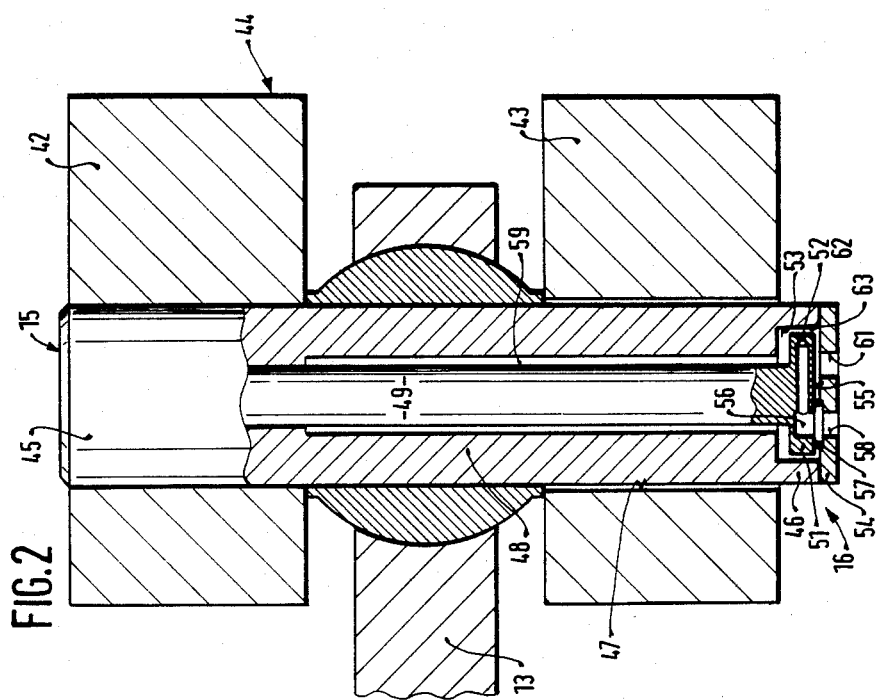
FIG. 2 is a view showing a longitudinal section of a hydromechanical transformer of the control arrangement of FIG. 1.

FIG. 2 shows a longitudinal section of the pin 15 of FIG. 1, in which the hydromechanical transformer 16 is integrated. The member 13 is pivotally supported on the pin 15 between an inner leg 42 and an outer leg 43 of a housing-fixed fork-shaped support 44. The pin 15 is fixedly clamped with its inner end 45 in the inner leg 42, whereas its outer end 46 extends through the outer leg 43 with a radial play 47. The pin 15 has a sleeve 48 formed as a structural element with bending elasticity. The sleeve 48 receives in the interior thereof a portion of a fixed bar 49 which has less bending elasticity than the sleeve. The bar 49 is clamped with its one end in the region of the inner leg 42 in the sleeve 48. The other free end of the bar 49 is expanded in a cup-shaped manner so as to form a flange 51.

A nozzle 52 is arranged in the flange 51. A deflecting plate 53 associated with the nozzle 52 is formed by the inner wall of a sleeve opening increased at this location. The flange 51 has a flat sealing face 55 facing toward a cover 54. A passage 56 connected with the nozzle 52 opens to the sealing face 55. The passage 56 in the plane 51 communicates via a sealing ring 57 with an inlet 58 arranged in the cover 54.

A pressure medium chamber 59 located downstream of the nozzle 52 and limited by the sleeve 48, the bar 49, and the cover 54 communicates with an outlet 61 in the cover 54. The sleeve 48 and the fixed bar 49 form parts of the hydromechanical transformer 16, movable relative to one another. The sleeve 48 which serves as a spring element is composed of a suitable material which has, in addition to the high strength, a suitable elasticity, for example of steel. Both ports 48 and 61 for the transformer 16 are formed in the cover 54 and thereby have the same end side of the pin 15, so that the transformer 16 can be laterally easily arranged in the second bridge branch 38. The inlet 58 communicates with an upstream portion of the second bridge branch 38, whereas the outlet 61 is connected with the downstream portion leading to the container 27.

The operation of the control arrangement for controlling the pulling force in the member 13 is as follows: It starts when the control arrangement is located in an adjustment condition of equilibrium, wherein the control pressure in the control lines 41 and 37 are equal and the control valve 22 assumes its shown central position 24 in which the power lift 19 is hydraulically blocked. The value of the pulling force acting in the member 13 corresponds to the nominal value given by the adjustable throttling point 39.

When the pulling force in the member 13 exceeds the nominal value given by the throttling point 39, the sleeve 48 with bending elasticity is deformed stronger, and the deflecting plate 53 approaches further the nozzle 52 on the spaced-fixed bar 49. The throttling point 63 formed by the nozzle 52 and the deflecting plate 53 throttles the cross-section stronger, so that the intermediate pressure in the control line 41 increases and the slider of the control valve 22 is displaced to its lifting position 29. The pressure medium from the pump 26 now is controlled via the control valve 22 in the power lift 19 which lifts via the lifting arm 18 and the lifting rod 17 the member 13 and thereby the plow 14 from the ground. Thereby the force in the member 13 is smaller and the transformer opens its throttling point 63 somewhat further, so that a new condition of equilibrium is adjusted, and the force of the member 13 corresponds to the desired nominal value and the position of the plow 14 is changed.

When the force in the member 13 lowers below the adjusted nominal value, the bending of the sleeve 48 is reduced and the throttling point 62 and the transformer 16 is controlled so that the intermediate pressure in the control line 41 of the control valve 22 drops. The intermediate pressure acting from the fixed throttles 35 and 36 in the control line 37 is now higher and displaces the control valve in its lowering position 31. Thereby the power lift 19 is unloaded via the control valve 22 to the container 27. Because of its own weight, the plow 14 dips deeper into the ground, the pulling force in the member 13 is further increased, and the transformer 16 strongly controls its throttling point 62. With the increased intermediate pressure in the control line 41 finally again a condition of equilibrium is attained, so that the control valve 22 assumes its central position 24.

With the pin 15 formed as the transformer 16, the sleeve 48 works as a bending rod which in the sense of its one-sided clamping point can be considered as a cantilever with an extension. The bending zone proper of the sleeve 48 extends from the clamping point in the inner leg 42 to the supporting point of the member 13. The remaining portion of the sleeve 48 between the member 13 and the cover 54 is not subjected to any bending, but respectively increases its lift transmission of the stroke in the region of the throttling point 62. By this arrangement the throttling point 62 at a maximum possible distance from the clamping point of the sleeve 48 in the inner leg 42 and from the supporting point of the member 13, the required stroke is practically obtained. It is further advantageous that because of the formation of the throttling point as nozzle-deflecting plate-transformer, a relatively small stroke must be preworked.

Further because of the shown construction of the transformer 16, the connections for the inlet and outlet can be arranged in an especially advantageous manner at the same end side of the pin 15. Because of the relatively low pressure in the control circuit 32 and the relatively small stroke, the O-ring 57 provides for a simple and inexpensive sealing between two relatively movable parts of the transformer 16. The value of the plate 47 is selected in an advantageous manner so that the outer leg 43 has an abutment for the sleeve 48 bent under load, thereby provides for an overloading protection. The pin 15 is so arranged in the tractor housing 11 that the bending of the sleeve 48 produced by the member 13 lies in considerably the same plane in which the nozzle 52 lies. Thereby the sleeve 48 and the bar 49 can move relative to one another relatively undisturbed, and the chamber 59 extends to the clamping point of the sleeve 48 in the inner leg 42. It is to be understood that the transformer 16 can process in the pin 15 both the pulling forces and the pressing forces.

Figure 3:
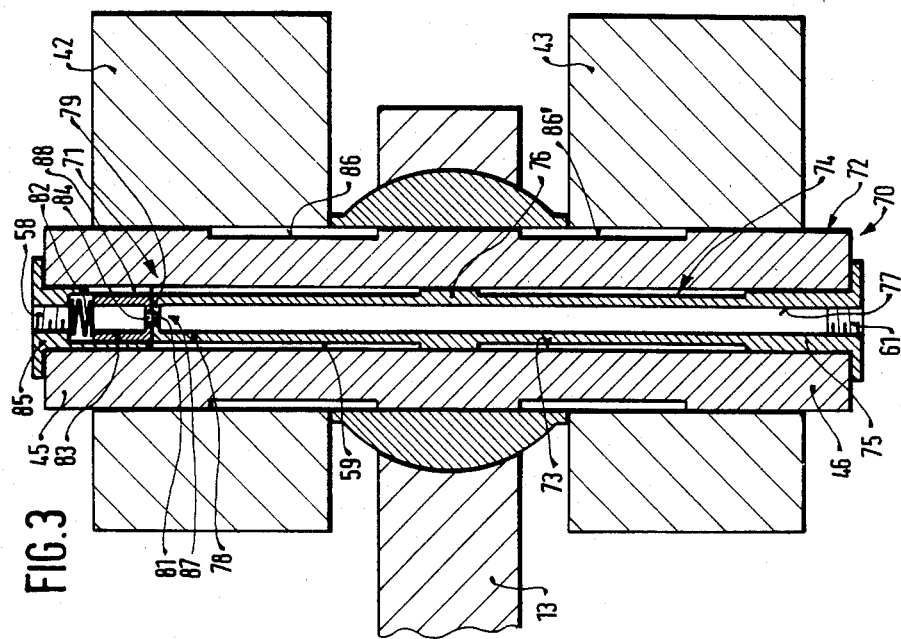
FIG. 3 is a view substantially corresponding to the view of FIG. 2 but showing a further embodiment of the invention.

FIG. 3 shows a longitudinal section of another embodiment of a pin 70 with an integrated transformer 71, instead of the pin 15 of FIG. 1. The pin 70 differs from the pin of FIG. 2 in that it is formed as a carrier supported at its both sides. Parts which are similar to the parts of FIG. 2 are identified here with the same reference numerals. The pin 70 has a sleeve 72 as a pressure element with bending elasticity. The sleeve 72 is formed by a throughgoing pipe and is fixedly clamped with its both ends 45 and 46 in the legs 42 and 43, respectively.

An element which does not have bending elasticity is arranged in a longitudinal opening 73 of the sleeve 72 and formed as a substantially tubular bar 74 with an outer diameter which is smaller than the diameter of the longitudinal opening 73. The bar 74 is centrally guided with the aid of a cylindrical portion 75 and in the region of the supporting point of the member 13 by a central cylindrical portion 76 in the longitudinal opening 13. A longitudinal passage 77 in the bar 74, which leads to the outlet 61, ends at a free end 78 of the bar 74 in a plane slider 79 with a throttling opening 81. A bracket-shaped sleeve 83 loaded by a spring 82 lies on the plane slider 79 and has an opening 84 associated with the throttling opening 81. The sleeve 83 is guided in a connecting sleeve 85 which is inserted in the longitudinal opening 73 of the pin 70 and has an inlet 58.

The sleeve 83 is arranged with a sufficient play in the connecting sleeve 85 so that when the pin 70 is deformed under load the sleeve 83 abuts tightly against the plane slider 79. For further increasing the value of the bending of the pin 70 under the load, the free legs between the clamping points of the sleeve 72 and both legs 42 and 43 and in the member 13 is increased by an annular groove-shaped recess 86 and 86'. The throttling opening 81 in the plane slider 79 forms together with the associated opening 84, an adjustable throttling point 87 of the transformer 71.

The operation of a control arrangement with the pin 70 in accordance with FIG. 3 substantially corresponds to the operation of the arrangement of FIG. 1, since with the increased pulling force in the member 13 the adjustable throttling point 87 is controlled, whereas with the decreased pulling force in the reverse order the throttling point 87 is controlled. In contrast to the pin of FIG. 2, the pin 70 is bent as a carrier with two supports, inasmuch as it is fixedly supported in both legs 42 and 43. The bending of the sleeve 72 which takes place under the load of the member 13 is transmitted in the region of the member 13 via the central portion 76 to the bar 74 which is fixedly clamped with the outer portion 75. The branch slider 79 at the free end of the bar carries out the respective stroke which leads via the adjustable throttling point 87 of the transformer 71 to a pressure change in the inlet 58. The distance of the plane slider 79 from the central portion 76 is selected as great as possible, and thereby in correspondence with the lift transmission the bending in the region of member 13 is increased in as great as possible stroke at the plane slider 79. A great stroke of the plane slider 79 is favored by the recesses 86 and 86' on the outer diameter of the sleeve 72, so that because of compact construction of the support of the member 13 the free distance between the clamping point is increased. During the operation the sleeve 83 is pressed additionally to the force of the springs 82 by the control oil flowing in the inlet 85, against the plane slider 79 so that a leakage of the pressure medium from the chamber 59 between the sleeve 83 and the plane slider 79 via the throttling opening 81 to the outlet 61 is avoided. The chamber 59 is in communication via a slot 88 arranged in the connecting sleeve 85, with the inlet 58. The construction of the pin 70 as two-sidedly supported carrier is used especially advantageously when the greater forces take place in the member 13. Contrary to this, in the event of small forces in the member 13 the sleeve 72 serving as a measuring spring can be composed of another material than steel. Particularly it is recommended to use a glass fiber reinforced synthetic plastic material which has a high strength and a small coefficient of elasticity and thereby allows great deformation.

Figure 4:
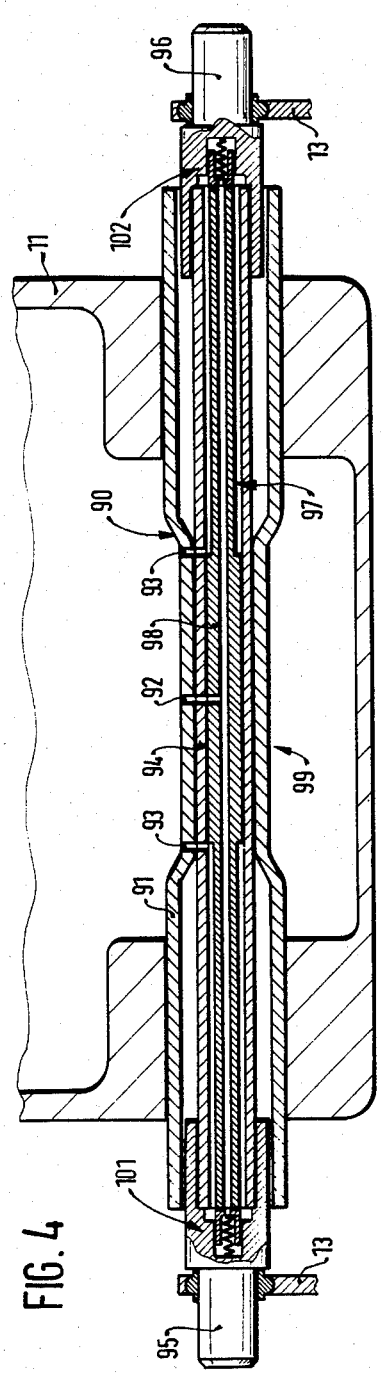
FIG. 4 is a view substantially corresponding to the views of FIGS. 2 and 3, but showing still a further embodiment of the invention.

FIG. 4 shows a part of a third embodiment of the control arrangement in a longitudinal section, in which the member 13 is supported in the tractor housing 11 with the aid of axle 90. The axle 90 has an outer pipe 91 mounted in the housing 11, and connections for an inlet 92 and an outlet 93 are provided in the outer pipe 91. Centered between both mounting points of the outer pipe 91 in the housing 11, a bending pipe 94 formed as a structural element having bending elasticity is fixedly clamped in the outer pipe 91. The bending pipe 94 carries as its outer ends coupling pins 95 and 96 for the member 13. In the interior of the bending pipe 94, a tubular bar 97 forming a spacially fixed element with less bending elasticity than the bending pipe is fixed with a thickened central portion 98.

Both ends of the bar 97 form, similarly to FIG. 3, with the aid of the plane sliders and the sleeves supported in the coupling pins 95 and 96, adjustable throttling points 101 and 102 with a resistance which changes proportionally to the forces acting in the member 13. Both throttling points 101 and 102 are connected parallel between the inlet 92 and the outlet 93. The construction in accordance with FIG. 4 is suitable for such type of tractors in which the lower member is supported on through axles. Further, the construction has the advantage that the bending pipe 94 is formed considerably long between the clamping point 99 and the throttling point 101 and 102, and thereby relatively great strokes can be obtained. The bending pipe 95 can be composed, for example, of steel.

Figure 5:
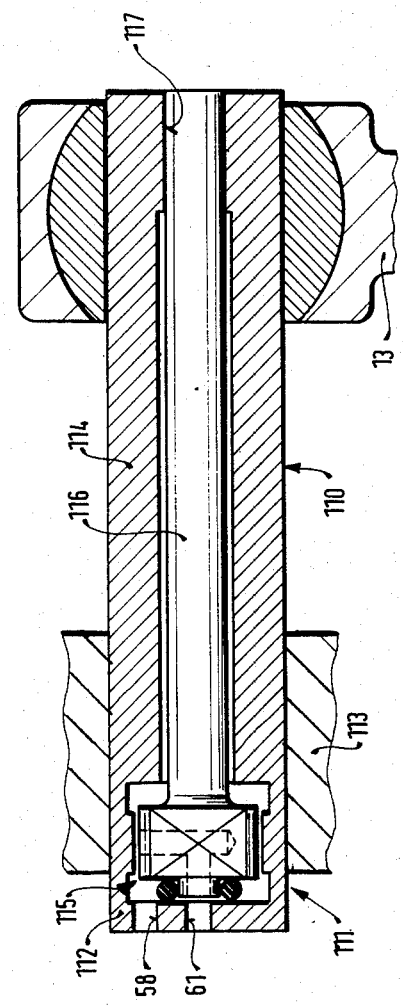
FIG. 5 is a view substantially corresponding to the views of FIGS. 2-4 but showing a fourth embodiment of the present invention.

FIG. 5 shows a fourth embodiment of the support of the member 13 with the aid of a pin 110 with an integrated transformer 111. The pin 110 is formed as a one-sidedly fixed cantilever with a sleeve 114 which forms a structural element with bending elasticity and is fixed with its end 112 in an ear 113 mounted in the housing 11. An adjustable throttling point 115 lies in the region of the clamping point at the end 112 and is formed by a free end of a bar 116 which is not exposed to bending forces. The bar 116 is clamped in the region of the plane of the member 13 in the sleeve 114. The throttling point 116 and the clamping point 117 of the bar 116 lies as far as possible from one another, for attaining a maximum possible stroke. The inlet 68 and the outlet 61 lie at the same end side of the pin 110 and in an advantageous manner at the same housing-fixed end. The pin 110 provides for a considerably simple and compact coupling of the member 13, however, the transformer 111 obtains no inlet signals. It is advantageous when the sleeve is composed of a material with a low coefficient of elasticity than steel, for example of a carbon fiber or glass fiber reinforced synthetic plastic material for increasing the bending and thereby the inlet signal in the transformer.

It is to be understood that variations of the above-shown embodiments can also be provided without deviating from the invention. Although FIG. 1 shows the control arrangement with a member 13, it is clear that it can be utilized for two lower members. For each lower member one pin 15 can be used, which is connected advantageously in parallel in the associated bridge branch. The shown hydromechanical force measuring is not limited to the utilization of the lower members, but also can be used for upper members. It is to be understood that the bridge circuit for the control circuit 32 can be formed in another manner and connected with the hydromechanical transformer. Although the construction in accordance with FIG. 2 is particularly advantageous with a nozzle-deflecting plate-transformer has a hydraulic resistance, another hydraulic resistance can be used at this point. The nozzle-deflecting plate-resistance in accordance with FIG. 2 can also be used in the construction of the pin in accordance with FIG. 3. The construction of the transformer as a pin in accordance with FIGS. 2 and 3 in accordance with the lift transmission for converting the bending in the lower member plane in an increased stroke at the throttling point provides for an especially advantageous combination. The transformer in the pin can be so formed that its throttling point controls with increased load.

It will be understood that each of the elements described above, or two or more together, may also find a useful application in other types of constructions differing from the types described above.

While the invention has been illustrated and described as embodied in a hydraulic control arrangement for actuating a lifting mechanism of an agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A hydraulic control arrangement for actuating a lifting mechanism of an agricultural machine, comprising
   a hydraulic motor arranged to lift and lower at least one member of a lifting mechanism;
   a hydraulic pressure medium source;
   a directional control valve arranged to control said hydraulic motor;
   a structural element having a bending elasticity arranged so that forces transmitted from said lifting mechanism member in a machine housing are at least partially transmitted via said structural element and the latter is bent when these forces are sufficient; and a hydromechanical transformer having two parts movable relative to one another, and a hydraulic control circuit for controlling said directional control valve and arranged so that bending of said structural element is used by said transformer as an adjusting valve, said hydraulic control circuit providing a pressure medium stream from said pressure medium source through said transformer, said structural element being directly formed by said parts movable relative to one another and influencing said pressure medium stream through said transformer, said parts including a first part which is hollow, has bending elasticity and is arranged to be exposed to the bending forces, and a second part which has less bending elasticity than said first part, is arranged so as to be free from exposure to the bending forces and is received in said first part, said second part being fixedly connected in at least one point with said first part, said first part having an end spaced from said at least one point, said second part having a free end formed with an adjustable throttle, said adjustable throttle being mounted in said end of said first part.

2. A hydraulic control arrangement as defined in claim 1; and further comprising at least one coupling pin arranged to support the lifting mechanism member and having a longitudinal axis, said structural element with bending elasticity extending substantially concentric to said longitudinal axis of said coupling pin.

3. A hydraulic control arrangement as defined in claim 1, wherein said structural element with bending elasticity is formed as a cantilever beam clamped at its one side.

4. A hydraulic control arrangement as defined in claim 1, including a machine housing having a fork-shaped support with legs; and further comprising a pin supporting a lifting mechanism member between the legs of the fork-shaped support and forming said hydromechanical transformer, said pin having an inlet and an outlet for the hydraulic pressure medium.

5. A hydraulic control arrangement as defined in claim 4, wherein said pin has a sleeve forming said first part of said structural element with bending elasticity, said sleeve having one end fixedly held in one of the legs of the support, and said end spaced from said at least one point extending through the other leg of the support with a radial play and forming in this region said adjustable throttle of the transformer.

6. A hydraulic control arrangement as defined in claim 5, wherein said second part of said structural element is in a fixing point fixed in the housing and has said free end provided with a radially arranged nozzle, said nozzle having a inlet connected with said inlet of said pin, said sleeve having an inner wall arranged opposite to said nozzle and forming a deflecting plate associated with the latter.

7. A hydraulic control arrangement as defined in claim 6, wherein said adjustable throttle has a throttling point which is spaced from said fixing point of said second part of said structural element with bending elasticity by a distance which is greater than the distance by which it is spaced from the lifting mechanism member, said throttling point being located outwardly beyond the region in which said second part extends with the plate through the other leg of the support.

8. A hydraulic control arrangement as defined in claim 6, wherein said second part of said structural element has a rod-shaped portion fixed at its one end and transiting at its free end in a cup-shaped flange having said nozzle, said flange having a flat sealing wall with a passage which communicates with said inlet with interposition of a sealing member.

9. A hydraulic control arrangement as defined in claim 4, wherein the other leg which surrounds said pin with a radial play forms an abutment for said pin bending under the load.

10. A hydraulic control arrangement as defined in claim 4, wherein said pin has a sleeve forming said first part of said structural element with bending elasticity, said sleeve being clamped in both legs of the support, said second part of said structural element being supported in the region of one of the legs and the lifting mechanism member and forming with its free end in the region of the other leg said adjustable throttle.

11. A hydraulic control arrangement as defined in claim 10, wherein said throttle is formed by a plane slider at said free end of said second part, and a member fixed with the machine housing and having an opening associated with slider.

12. A hydraulic control arrangement as defined in claim 11, wherein said member provided with said opening is formed as an axially spring-loaded sleeve having a bottom wall abutting against said plane slider of said second part.

13. A hydraulic control arrangement as defined in claim 10, wherein said second part has a longitudinal passage, said inlet and said outlet being formed in opposite end sides of said pin.

14. A hydraulic control arrangement as defined in claim 4, wherein both said inlet and outlet of said pin are formed at one end of said pin.

15. A hydraulic control arrangement as defined in claim 4, wherein said pin is composed of a material with a higher strength and a substantially smaller coefficient of elasticity than steel.

16. A hydraulic control arrangement as defined in claim 15, wherein said pin is composed of a material selected from the group consisting of a fiber reinforced synthetic plastic material, a nickel alloy and bronze.

17. A hydraulic control arrangement as defined in claim 1, wherein said structural element with bending elasticity includes a bending pipe which forms said first part and is provided at its one end with coupling pins supporting a lifting mechanism member, said bending pipe being fixed centrally between the lifting mechanism member in a machine housing, said bending pipe being simultaneously clamped with said second part, and said second part having both of its ends free and extending with its free ends into said coupling pins respectively and forming there two such adjustable throttles having hydraulic throttling points.

18. A hydraulic control arrangement as defined in claim 17, wherein said second part of said structural element is tubular and has a thickened portion where it is clamped to said bending pipe.

19. A hydraulic control arrangement as defined in claim 17, wherein said throttling points are arranged in parallel relative to one another.

20. A hydraulic control arrangement as defined in claim 1, wherein said control circuit is formed as a hydraulic bridge circuit in which said hydromechanical transformer lies.

21. A hydraulic control arrangement as defined in claim 1; and further comprising a pin supporting a lifting mechanism member in an eye fixed to a machine housing, said pin forming said hydromechanical transformer, said pin having a sleeve forming said first part and having one end fixed in the eye and another free end forming said end spaced from said at least one point supporting the lifting mechanism member, said free end of said sleeve having a bar fixed therein and forming said second part, said bar having said free end of said second part forming said throttle of said transformer in the region of said one end of said sleeve.

* * * * *